US012233514B2

(12) United States Patent
Liu

(10) Patent No.: US 12,233,514 B2
(45) Date of Patent: Feb. 25, 2025

(54) ADJUSTABLE RATCHET WRENCH

(71) Applicant: Haisheng Liu, Hudson, OH (US)

(72) Inventor: Haisheng Liu, Hudson, OH (US)

(*) Notice: Subject to any disclaimer, the term of this patent is extended or adjusted under 35 U.S.C. 154(b) by 328 days.

(21) Appl. No.: 17/871,000

(22) Filed: Jul. 22, 2022

(65) Prior Publication Data

US 2024/0025020 A1 Jan. 25, 2024

(51) Int. Cl.
*B25B 13/14* (2006.01)
*B25B 13/46* (2006.01)

(52) U.S. Cl.
CPC ............ *B25B 13/14* (2013.01); *B25B 13/462* (2013.01)

(58) Field of Classification Search
CPC .............................. B25B 13/14; B25B 13/462
See application file for complete search history.

(56) References Cited

U.S. PATENT DOCUMENTS 1,430,734 A * 10/1922 Gibson ................... B25B 13/14 81/63.2
1,542,291 A * 6/1925 Economides ....... B25B 13/5016 81/176.1
3,385,142 A * 5/1968 Cunningham .......... B25B 13/44 81/129.5
5,090,273 A * 2/1992 Fossella ................ B25B 13/463 81/57.13
5,819,607 A 10/1998 Carnesi
5,918,511 A 7/1999 Sabbaghian et al.
6,000,300 A 12/1999 Plamondon
6,467,379 B1 10/2002 Wizman
6,952,984 B2 10/2005 Wang
7,478,577 B1 1/2009 Wheeler
7,707,916 B2 5/2010 Pirseyedi
7,878,092 B1 2/2011 Eby et al.
7,946,200 B2 5/2011 Chang
8,424,422 B2 4/2013 Liang
8,555,751 B1 10/2013 Chern
8,601,912 B2 12/2013 Huang et al.
8,893,590 B2 11/2014 Chen
8,893,592 B2 11/2014 Womack
8,919,225 B2 12/2014 Row
8,950,295 B2 2/2015 Chiang
9,475,178 B2 10/2016 Pelletier et al.
9,533,407 B1 1/2017 Ragner
9,573,252 B1 2/2017 Lee et al.
9,636,806 B1 5/2017 Lee et al.
10,399,213 B2 9/2019 Wang
10,688,629 B2 6/2020 Barzelay et al.
10,716,691 B2 * 7/2020 Saar .......................... A61F 2/95
10,737,370 B2 * 8/2020 Gehling .................. B25B 13/32
(Continued)

FOREIGN PATENT DOCUMENTS

AU 2008201152 B2 11/2011
EP 3153278 A1 4/2017

*Primary Examiner* — David B. Thomas
(74) *Attorney, Agent, or Firm* — Jacob M. Ward; Ward Law Office LLC

(57) ABSTRACT

An adjustable ratchet wrench is provided that includes a base plate and a top plate rotatably coupled to the base plate. A plurality of grippers may form an interior polygonal shape within a center of the base plate and the top plate for gripping a workpiece. A plurality of push rods coupled to the grippers may move the grippers to change the size of the interior polygonal shape as the top plate is rotated with respect to the base plate.

19 Claims, 9 Drawing Sheets

(56) References Cited

U.S. PATENT DOCUMENTS

| | | | | |
|---|---|---|---|---|
| 10,773,363 | B2 | 9/2020 | Liao | |
| 11,148,264 | B2 | 10/2021 | Barzelay | |
| 11,253,979 | B2 * | 2/2022 | Gehling | B25B 13/5075 |
| 12,036,639 | B2 * | 7/2024 | Wach | B25B 13/14 |
| 2014/0041489 | A1 | 2/2014 | Chien | |
| 2017/0095908 | A1 * | 4/2017 | Elmi | B25B 13/14 |
| 2018/0229348 | A1 | 8/2018 | Womack | |
| 2020/0147763 | A1 * | 5/2020 | Lee | B25B 13/28 |
| 2021/0069873 | A1 * | 3/2021 | Wach | B25B 13/463 |

* cited by examiner

ADJUSTABLE RATCHET WRENCH

FIELD

The disclosure generally relates to hand tools and, more particularly, to an adjustable wrench with an adjustable polygonal shape that may be used to turn a polygonally shaped workpiece, such as a hex bolt or nut.

INTRODUCTION

This section provides background information related to the present disclosure which is not necessarily prior art.

An adjustable wrench may include a pair of opposing sides, with one side adjustable relative to an opposite side using a sliding mechanism to fit the wrench to differently sized polygonal shaped workpieces (e.g., polygonal bolt head or nut). The adjustable side may be moved by turning a linear thread, such as worm screw to slide or move the adjustable side to change a distance between the pair of opposing sides. This enables the adjustable wrench to fit and turn varying sizes of workpieces. However, when force is applied to the workpiece, only the pair of opposing sides may interact with the workpiece to apply force to turn the workpiece. Due to the nature of the sliding mechanism, a stuck or tough workpiece may expand the distance between the pair of opposing sides. This expansion of the pair of opposing sides of the wrench may cause the adjustable wrench to apply a force to the corners or edges of the workpiece rather than the sides to which the wrench was originally engaged. This may cause the adjustable wrench to slip off or damage the polygonal shape of the workpiece by rounding off the corners or edges of the workpiece. Consequently, such an adjustable wrench may only be used for light duty jobs and applications.

A fixed size wrench may be preferred for more heavy duty jobs. However, the fixed size wrench is only usable for a single sized workpiece. For differently sized workpieces, a set of differently sized wrenches is necessary. It may be time consuming and require effort to find the correct size wrench for a specific workpiece. This may be especially true where the exact size of the workpiece is not known and may be exacerbated by interchanging of workpieces between metric and standard or SAE sizing of workpieces.

Various methods and devices have been proposed to improve the adjustable wrench. Such devices may include an aperture wrench and a diaphragm wrench. However, while these devices may interact with differently sized workpieces by changing the size of an aperture of the wrench, they still may expand when placed against a stuck workpiece or when trying to sufficiently tighten the workpiece. In addition, such wrenches may be too large, making them impractical to engage a workpiece, for example, when the workpiece is in a difficult to reach area.

Accordingly, there is a need for an adjustable wrench that is easily adjusted to engage six sides of a workpiece, and which maintains a constant size and contact when engaging the workpiece.

SUMMARY

In concordance with the instant disclosure, an adjustable wrench that is easily adjusted to engage six sides of a workpiece, and which maintains a constant size and contact when engaging the workpiece, has been surprisingly discovered.

In certain embodiments, an adjustable wrench includes a base plate and a top plate rotatably coupled to the base plate. A plurality of grippers may form an interior polygonal shape within a center of the base plate and the top plate for gripping a workpiece. A plurality of push rods coupled to the grippers may move the grippers to change the size of the interior polygonal shape as the top plate is rotated with respect to the base plate. A plurality of holes of the base plate and the top plate may be configured to hold the plurality of grippers and the plurality of push rods. In particular, the base plate and the top plate may include six holes for holding six grippers and six push rods. The six holes may be spaced approximately sixty degrees apart around a circumference of the base plate and the top plate. In certain embodiments, the interior polygonal shape may be configured to engage one of a standard sized workpiece and a metric sized workpiece. The plurality of grippers and the plurality of push rods may be configured to fit between the base plate and the top plate. The plurality of grippers may simultaneously move as the top plate is rotated with respect to the base plate.

In certain embodiments, the top plate is manually rotated with respect to the base plate. Alternatively, a worm screw may be used to rotate the top plate with respect to the base plate. The adjustable wrench may only be movable in a first direction to tighten or loosen a workpiece, such that the adjustable wrench may be turned over to move the adjustable wrench in a second opposite direction to tighten or loosen the workpiece. The adjustable wrench may include a ratcheting mechanism for tightening and loosening the workpiece such that the ratcheting mechanism permits the adjustable wrench to apply a turning force in one direction, while freely moving in the opposite direction. The plurality of grippers may include a plurality of teeth for gripping the workpiece.

In certain embodiments, the plurality of grippers attaches to the top plate and the plurality of push rods attach to the base plate. Alternatively, the plurality of grippers attaches to the base plate the plurality of push rods attach to the top plate. In certain embodiments, a gripper may include a gripper hole at a corner of the gripper for receiving a first push rod stud of the push rod. The interior polygonal shape may be continuously tightened onto a workpiece as the workpiece is turned using the adjustable wrench. For example, when the handle and/or the adjustable wrench is pushed in a proper direction, the push rods will push the grippers to the inside, tightening the interior polygonal shape onto the workpiece.

A method of using an adjustable wrench may include turning a top plate with respect to a base plate of the adjustable wrench to adjust a size of an interior polygonal shape of the adjustable wrench fit a workpiece. The interior polygonal shape may be fit onto the workpiece, such that when the interior polygonal shape is placed onto the workpiece, each side of the workpiece is engaged by the interior polygonal shape. The adjustable wrench may be rotated in a first direction to tighten the workpiece. In certain embodiments, a worm screw may be used to rotate the top plate with respect to the base plate. The method may further include removing the adjustable wrench from the workpiece and turning the turning the adjustable wrench over. The adjustable wrench may then be placed back onto the workpiece and turned in a second direction, opposite the first direction to loosen the workpiece.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

Figure 1A:
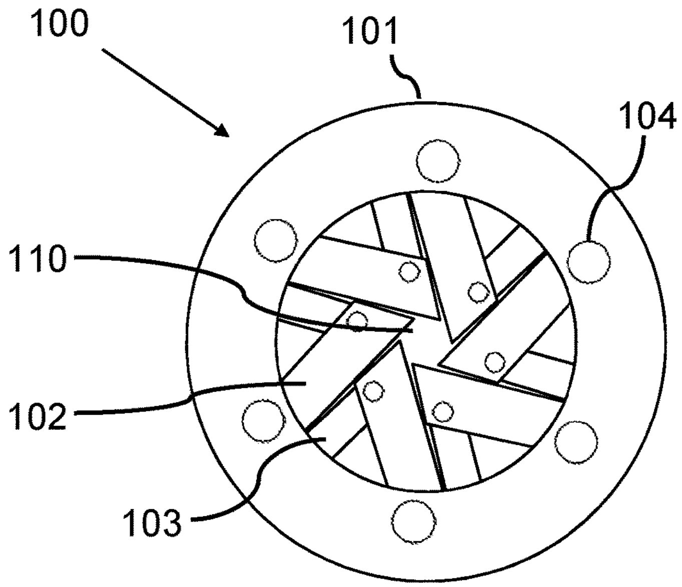
FIGS. 1A-1C are a series of top plan views of a first embodiment of an adjustable wrench where the size of an interior polygon is increasing in size by a rotation of the top plate relative to the base plate as indicated by the arrow, in accordance with the present technology.
Figure 1B:
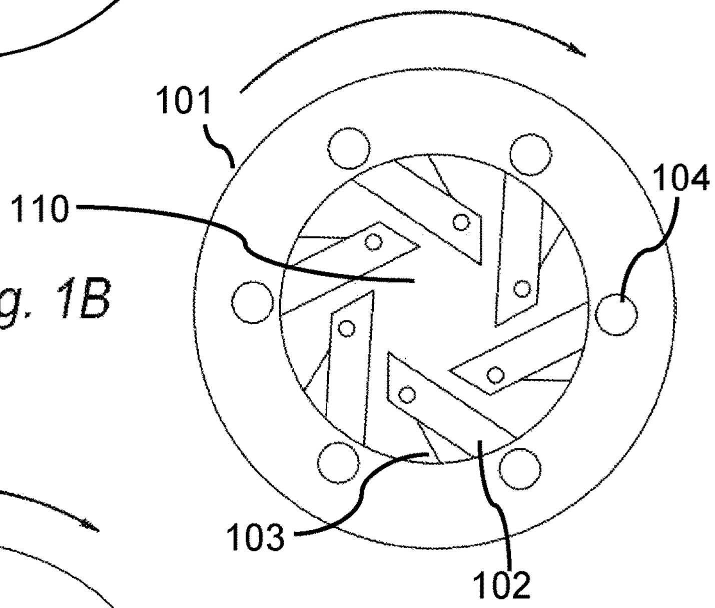
Figure 1C:
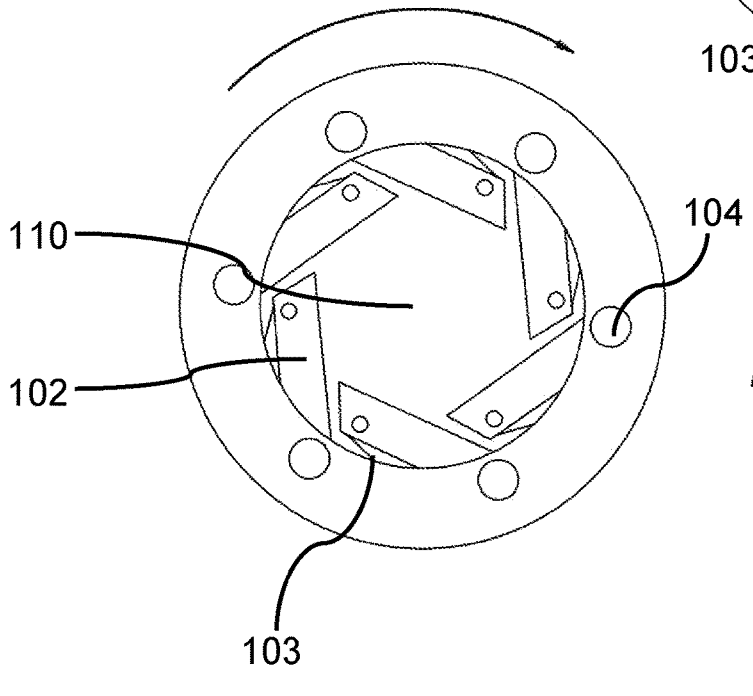
Figure 1D:
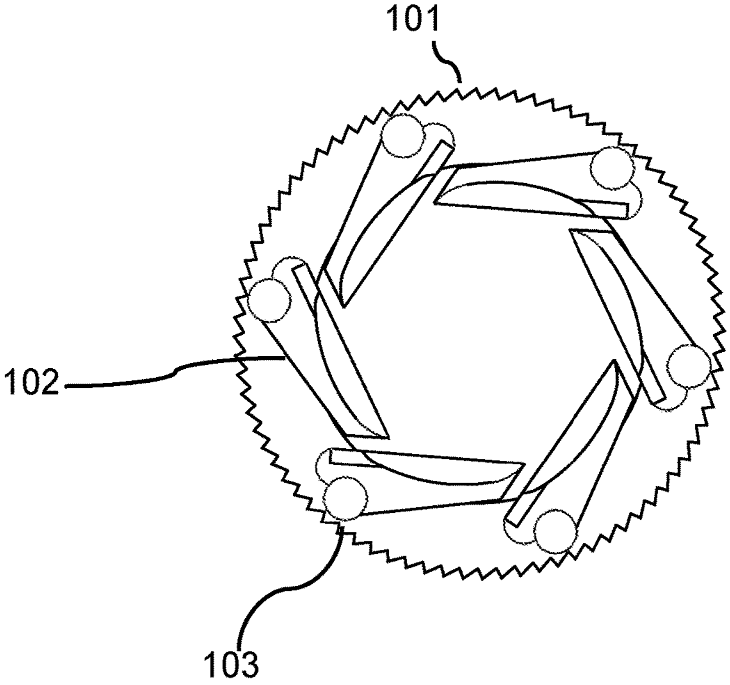
FIGS. 1D-1F are a partially exploded view of the adjustable wrench showing a movement of the internal components thereof.
Figure 1E:
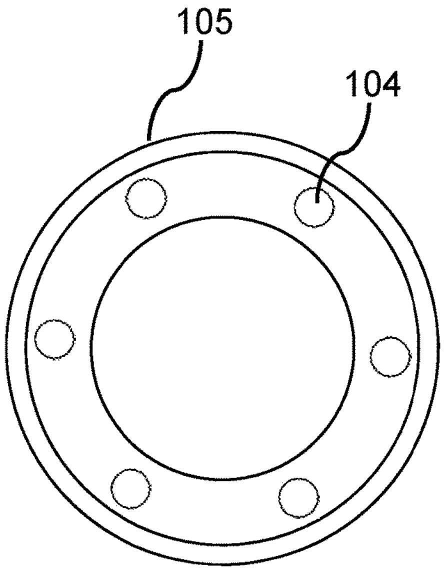
Figure 1F:
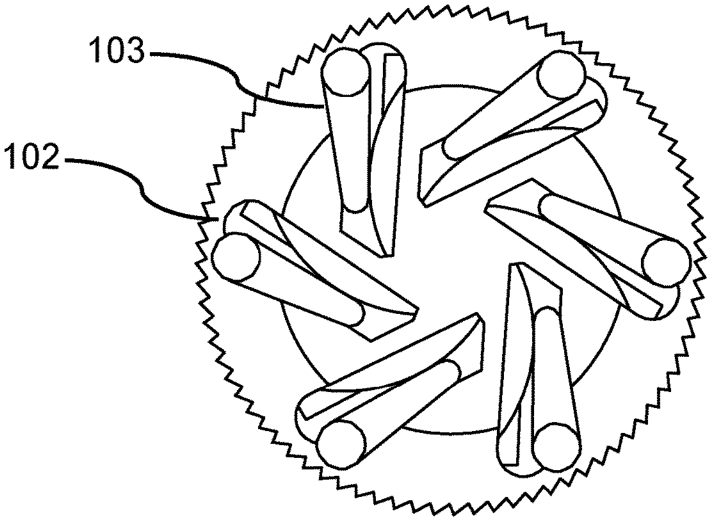
Figure 2A:
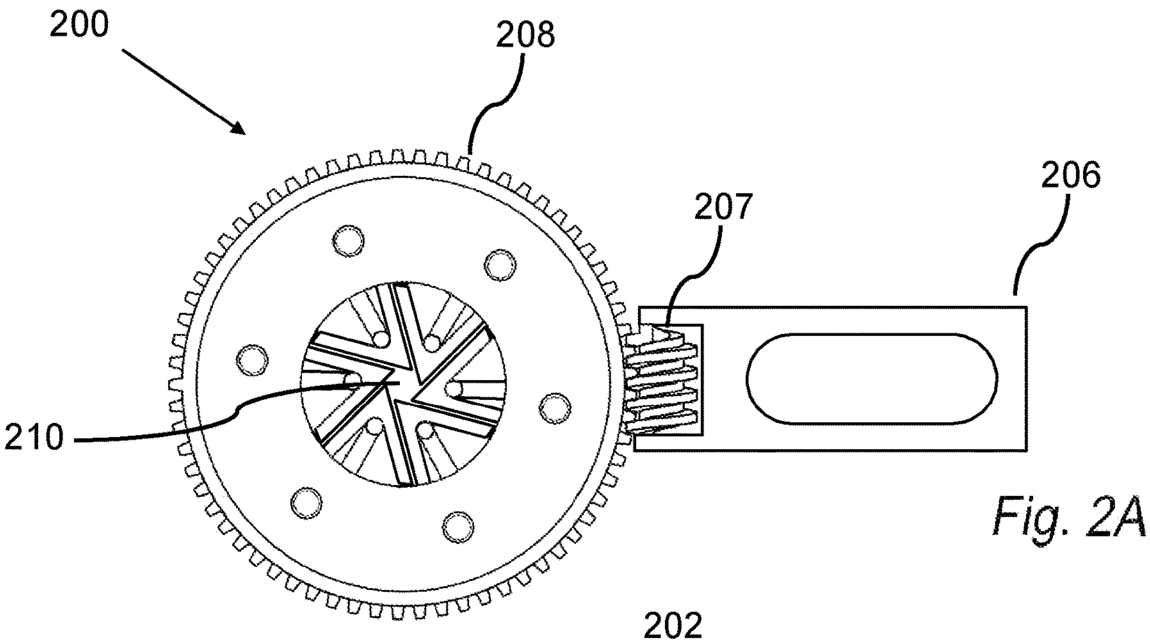
FIGS. 2A-2C are a series of top plan views of a second embodiment of an adjustable wrench where the size of an interior polygon is increasing in size by a rotation of the top plate relative to the base plate as a worm screw is turned as indicated by the arrows, in accordance with the present technology.
Figure 2B:
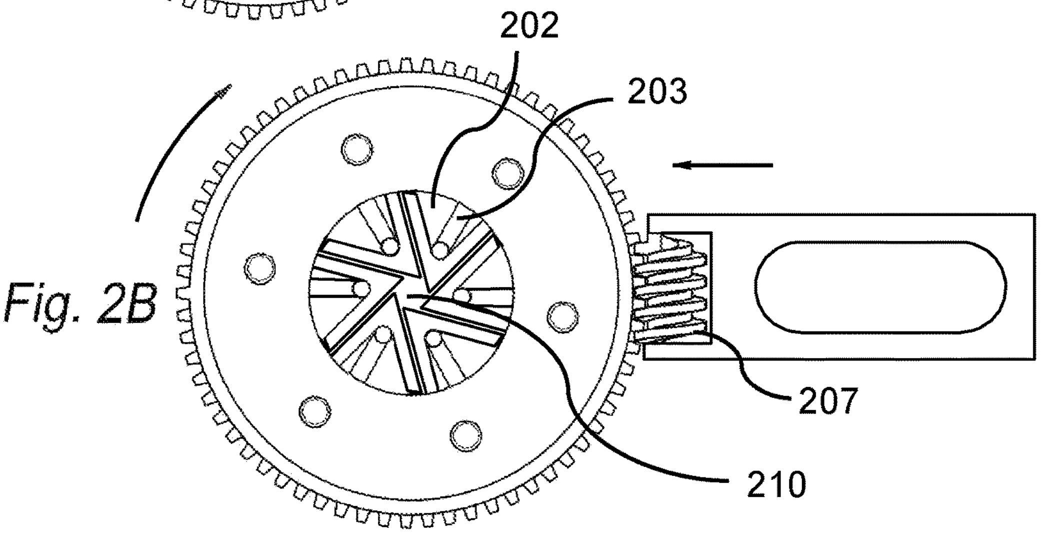
Figure 2C:
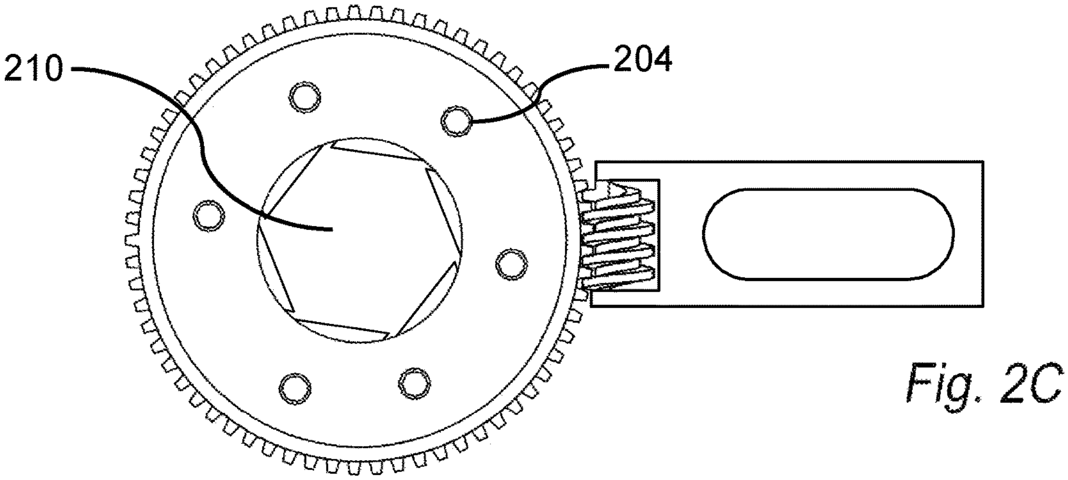
Figure 2D:
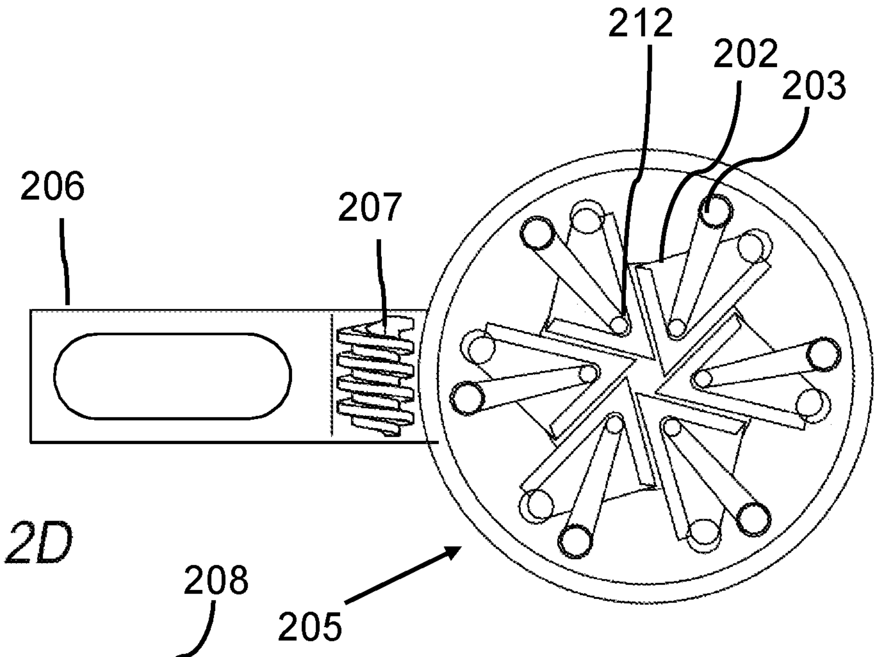
FIGS. 2D and 2E are a partially exploded view of the second embodiment of the adjustable wrench showing a movement of the internal components thereof.
Figure 2E:
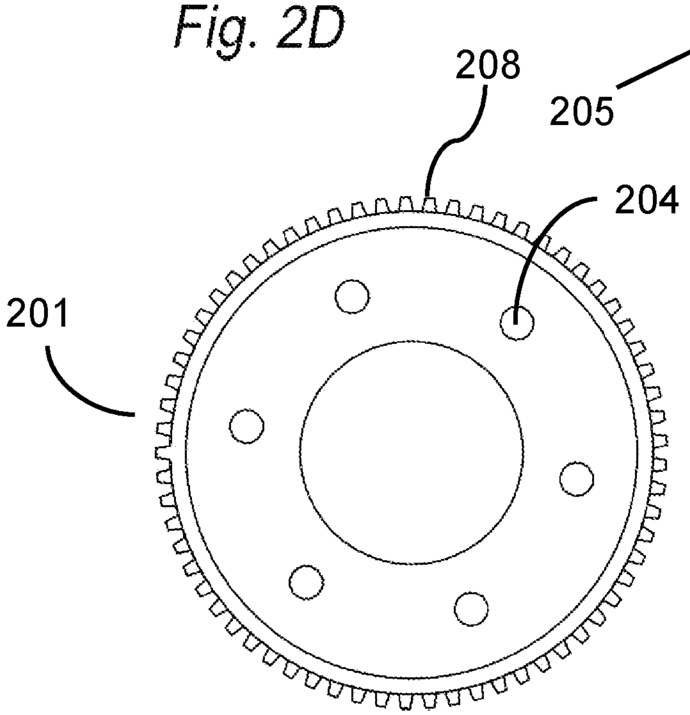

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to an adjustable wrench including a plurality of movable grippers. The grippers may be configured to form a polygonal shape to fit a polygonal shape of a workpiece. The plurality of grippers may move in a harmonic fashion to change a size of an interior polygon for engaging the workpiece. In certain embodiments, the adjustable wrench may include six grippers configured to engage six sides of the workpiece. For example, six grippers may move in a harmonic fashion to change a size of an interior hexagon, such that the six grippers may be configured to form a hexagonal shape to fit a hexagonal workpiece; e.g., a hex bolt or nut. In certain embodiments, the interior polygon of the adjustable wrench may be configured to engage, a nut, a screw, and a bolt. However, as would be apparent to someone of ordinary skill in the art, the adjustable wrench may be configured to engage and turn any appropriately desired workpiece.

A first end of the grippers may be coupled to an adjustable or top plate of the adjustable wrench. The top plate may be rotated in a circular fashion, for changing the size of the interior hexagon. A second end of the grippers may be coupled to a first end of a push rod. In certain embodiments, the second end of the grippers may be close to a center of the grippers. A second end of the push rod may be coupled to a base plate. In certain embodiments, the base plate may include a handle for the adjustable wrench. The adjustable wrench may further include a ratcheting mechanism for the adjustable wrench. The top plate and the base plate may be rotated about the center polygon of the adjustable wrench.

As the top plate is rotated with respect to the base plate, a size of the interior polygon may increase or decrease as appropriately desired. In particular, as the top plate is rotated with respect to the base plate, movement of the push rods in combination with the grippers will simultaneously change a position of the grippers to change the size of the interior hexagon. Adjusting the size of the interior polygonal shape enables the adjustable wrench to fit differently sized workpieces.

After the top plate is used to adjust a size of the interior polygon to fit the workpiece, the interior polygon may engage the workpiece. When the handle is rotated in a proper direction, such as to tighten or loosen the workpiece, the push rods are configured to push toward a center, which will push on the grippers to maintain a tight and secure contact with the workpiece.

In certain embodiments, the base plate together with the top plate form an enclosure for the components of the adjustable wrench. In certain embodiments, a plurality of holes within the base plate and the top plate may be spaced approximately sixty degrees apart to engage six grippers and six push rods. In this manner, when the top plate is turned, a six-sided polygon (i.e., a hexagon) is formed in a center opening of the base plate and the top plate for engaging each side of a six-sided workpiece. However, as would be apparent to someone of ordinary skill in the art, the base plate and/or the top plate may comprise any appropriately desired number of holes for securing an appropriately desired number of grippers and push rods. The holes are configured to secure a desired number of grippers and push rods. In particular, the holes may not travel through the top plate and/or the base plate. The holes may comprise any appropriately desired depth for holding the grippers and the push rods. For example, the holes may be on a top side or a bottom side of the base plate and the top plate such that the holes are on an inside of the enclosure and are not seen from the top side or the bottom side of the adjustable wrench.

A gripper may include a gripper stud and a gripper hole for receiving a first push rod stud. The gripper stud may engage a hole of one of the base plate and the top plate. The push rod may include the first push rod stud for engaging the gripper at an interior of the gripper. The push rod may also include a second push rod stud for engaging a hole of one of the base plate and the top plate. Where the gripper stud engages a hole of the base plate, the second push rod stud may engage a hole of the top plate. Alternatively, where the gripper stud engages a hole of the top plate, the second push rod stud may engage a hole of the base plate.

In certain embodiments, an edge of the top plate is configured to fit inside an edge of the base plate. Alternatively, the top plate may be configured to fit over an edge of the base plate. The grippers and the push rods may be configured to fit between the base plate and the top plate, when the base plate and the top plate are coupled together. The base plate and the top plate may have a same size center opening such that the grippers may be adjusted and used to grab a workpiece.

When the top plate is rotated with respect to the base plate, the push rods, which are coupled to the base plate, push an inner portion of the grippers and change an orientation of the grippers to make the interior polygonal shape smaller or larger for engaging a workpiece. When the interior polygonal shape is fitted to the workpiece, the adjustable wrench may be turned to move the workpiece in a proper direction. As the adjustable wrench is turned, the push rods push the grippers inward, thus tightening the grip on the workpiece.

In certain embodiments, the adjustable wrench may include a base plate and a top plate rotatably coupled to the base plate. A plurality of grippers coupled to the base plate and the top plate may form an interior polygonal shape within a center aperture of the base plate and the top plate. A plurality of push rods are coupled to the grippers. When the top plate is rotated with respect to the base plate, the push rods move the grippers to change a size of the interior polygonal shape. The interior polygonal shape may be used to grasp a workpiece such as a bolt, a screw, a nut or other polygonally shaped workpiece. In particular, an edge of the polygonally shaped gripper may contact an edge of the workpiece to turn and tighten or loosen the workpiece.

The base plate and the top plate may include a plurality of holes for receiving the grippers and the push rods. For example, the base plate and the top plate may include six holes for engaging six grippers and six push rods. In certain embodiments, the holes may be spaced approximately 60 degrees apart around a circumference of the base plate and the top plate. In this manner, the interior polygonal shape may engage six sides of a polygonally shaped workpiece. In particular, an inner side of a gripper may uniformly contact each side of the workpiece. The workpiece may include a standard sized workpiece and a metric sized workpiece. In particular, the workpiece may include any appropriately desired six-sided workpiece.

In certain embodiments, the plurality of grippers and the plurality of push rods may be configured to couple to the plurality of holes and fit within a space between the top plate and the base plate. In certain embodiments, as the top plate is rotated with respect to the base plate, the plurality of grippers may be configured to simultaneously move to adjust the size of the interior polygonal shape. The top plate may be manually rotated with respect to the base plate to change the size of the interior polygonal shape. Alternatively, a worm screw may be used to rotate the top plate with respect to the base plate. In certain embodiments, the adjustable wrench is only movable in a first direct to tighten or loosen a workpiece, such that the adjustable wrench must be turned over to move the adjustable wrench is a second opposite direction to tighten or loosen the workpiece. The adjustable wrench may include a ratcheting mechanism for tightening and loosening the workpiece such that the ratcheting mechanism permits the adjustable wrench to apply a turning force in one direction, while freely moving in the opposite direction.

The plurality of grippers may attach to the top plate and the plurality of push rods may attach to the base plate. Alternatively, the plurality of grippers may attach to the base plate and the plurality of push rods may attach to the top plate. In certain embodiments, a gripper may include a gripper hole at a corner of the gripper for receiving a first push rod stud of the push rod. The interior polygonal shape may be continuously tightened onto a workpiece as the workpiece is turned using the adjustable wrench. For example, when the handle and/or the adjustable wrench is pushed in a proper direction, the push rods will push the grippers to an inside, tightening the interior polygonal shape onto the workpiece.

In certain embodiments, a method of using an adjustable wrench may include turning a top plate with respect to a base plate of the adjustable wrench to adjust a size of an interior polygonal shape of the adjustable wrench. The interior polygonal shape may be fit onto a workpiece, such that when the interior polygonal shape is placed onto the workpiece, each side of the workpiece is engaged by the interior polygonal shape. The adjustable wrench may be rotated in a first direction to tighten the workpiece. In certain embodiments, a worm screw may be used to rotate the top plate with respect to the base plate. The method may further include removing the adjustable wrench from the workpiece and turning the adjustable wrench over. The adjustable wrench may then be placed back onto the workpiece and turned in a second direction, opposite the first direction to loosen the workpiece.

Advantageously, the adjustable wrench includes six sides which simultaneously grasp six sides of a workpiece when tightening and loosening the workpiece. When a top plate is rotated with respect to the base plate, grippers change position simultaneously to adjust a size of an interior polygonal shape to fit differently sized workpieces. Then, when the adjustable wrench is placed onto a workpiece, it may be moved in a proper direction to tighten or loosen the workpiece. As the adjustable wrench is rotated, push rods may be pushed toward the center of the interior polygonal shape which moves grippers inward such that the grippers maintain contact with all sides of the workpiece. As such, the adjustable wrench is able to maintain a tight contact with the workpiece, that the adjustable wrench will not slip from or otherwise damage the workpiece as it is turned.

EXAMPLES

Example embodiments of the present technology are provided with reference to the several figures enclosed herewith.

As shown in FIGS. 1A-1F, an adjustable wrench 100 is provided. The adjustable wrench 100 may include a base plate 105 and a top plate 101 rotatably coupled to the base plate 105. A plurality of grippers 102 may form an interior polygonal shape 110 within a center of the base plate 105 and the top plate 101 for gripping a workpiece. A plurality of push rods 103 coupled to the grippers 102 may move the grippers 102 to change the size of the interior polygonal shape 110 as the top plate 101 is rotated with respect to the base plate 105. A plurality of holes 104 of the base plate 105 and the top plate 101 may be configured to hold the plurality of grippers 102 and the plurality of push rods 103. The base plate 105 and the top plate 101 may include any appropriately desired number of holes 104 for receiving a gripper 102 and a push rod 103. In particular, the base plate 105 and the top plate 101 may include six holes 104 for holding six grippers 102 and six push rods 103. The six holes 104 may be spaced approximately sixty degrees apart around a circumference of the base plate 105 and the top plate 101. In certain embodiments, the interior polygonal shape 110 may be configured to engage a standard sized workpiece or a metric sized workpiece. The plurality of grippers 102 and the plurality of push rods 103 may be configured to fit between the base plate 105 and the top plate 101. The plurality of grippers 102 may simultaneously move as the top plate 101 is rotated as indicated by the arrow, with respect to the base plate 105. In certain embodiments, the top plate 101 comprises an adjustable plate, which may be rotated in one of a first direction and a second direction opposite the first direction to adjust a size of the interior polygonal shape 110 for fitting onto differently sized workpieces.

In certain embodiments, the top plate 101 may be manually rotated with respect to the base plate. The adjustable wrench 100 may only be movable in a first direction to tighten or loosen a workpiece, such that the adjustable wrench 100 may be turned over to move the adjustable wrench 100 in a second opposite direction to tighten or loosen the workpiece.

In certain embodiments, such as shown in FIGS. 2A-5, the adjustable wrench 200 may include a handle 206 and a worm screw 207. The worm screw 207 may be used to rotate the top plate 201 with respect to the base plate 205. The worm screw 207 may be in contact with one or more teeth 208 of the top plate 201 to turn the top plate 201 when the worm screw 207 is moved in a first direction and a second direction, as indicated by the arrows. The adjustable wrench 200 may be similar to the adjustable wrench 100, such as described above.

The adjustable wrench 200 may include the base plate 205 and the top plate 201 rotatably coupled to the base plate 205.

A plurality of grippers 202 coupled to the base plate 205 and the top plate 201 may form an interior polygonal shape 210 within a center aperture of the base plate 205 and the top plate 201. A plurality of push rods 203 may be coupled to the grippers 202. When the top plate 201 is rotated with respect to the base plate 205, using the worm screw 207, the push rods 203 may move the grippers 202 to change a size of the interior polygonal shape 210. The interior polygonal shape 210 may be used to grasp a workpiece such as a bolt, a screw, a nut or other polygonally shaped workpiece. In particular, an edge of a gripper 202 may contact an edge of the workpiece to turn and tighten or loosen the workpiece.

The base plate 205 and the top plate 201 may include a plurality of holes 204 for engaging the gripper 202 and the push rods 203. For example, in certain embodiments, the base plate 205 and the top plate 201 may include six holes 204 for engaging six grippers 202 and six push rods 203. In certain embodiments, the holes 204 may be spaced approximately 60 degrees apart around a circumference of the base plate 205 and the top plate 201. In this manner, the interior polygonal shape 210 may be configured to engage six sides of a polygonally shaped workpiece. In particular, an inner side of a gripper 202 may uniformly contact each side of the workpiece. The workpiece may include a standard sized workpiece and a metric sized workpiece. In particular, the workpiece may include any appropriately desired six-sided workpiece.

Figure 4D:
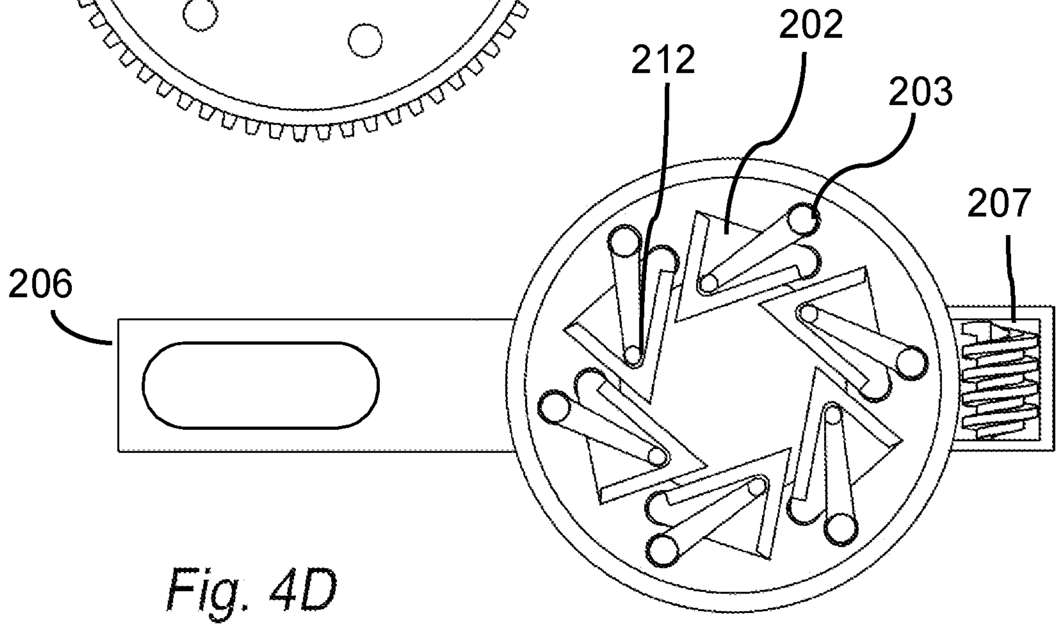
FIGS. 4B-4D are a partially exploded view of the third embodiment of the adjustable wrench showing the movement of the internal components thereof.
Figure 3:
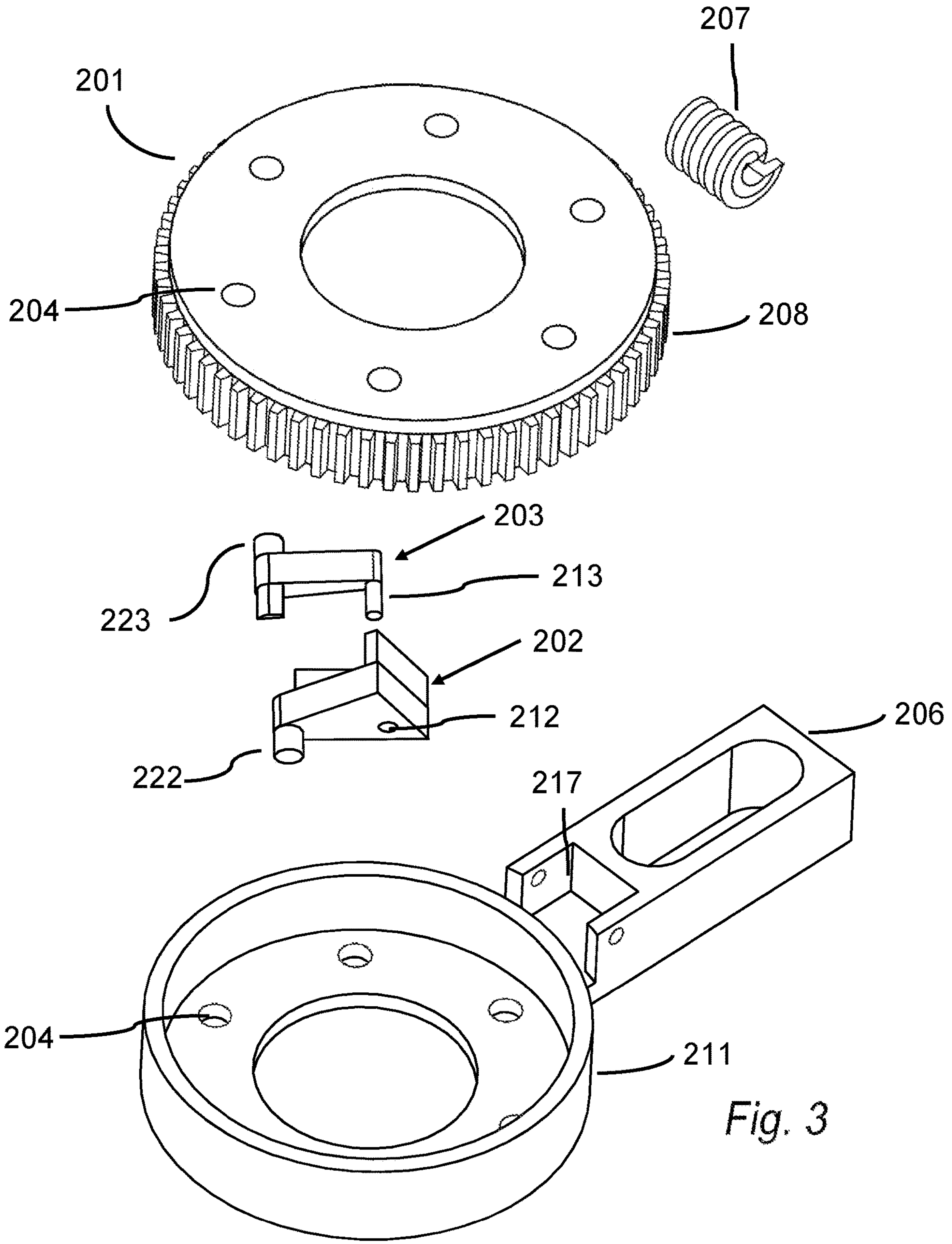
FIG. 3 is an exploded view of the second embodiment of the adjustable wrench showing the internal components thereof.
Figure 4A:
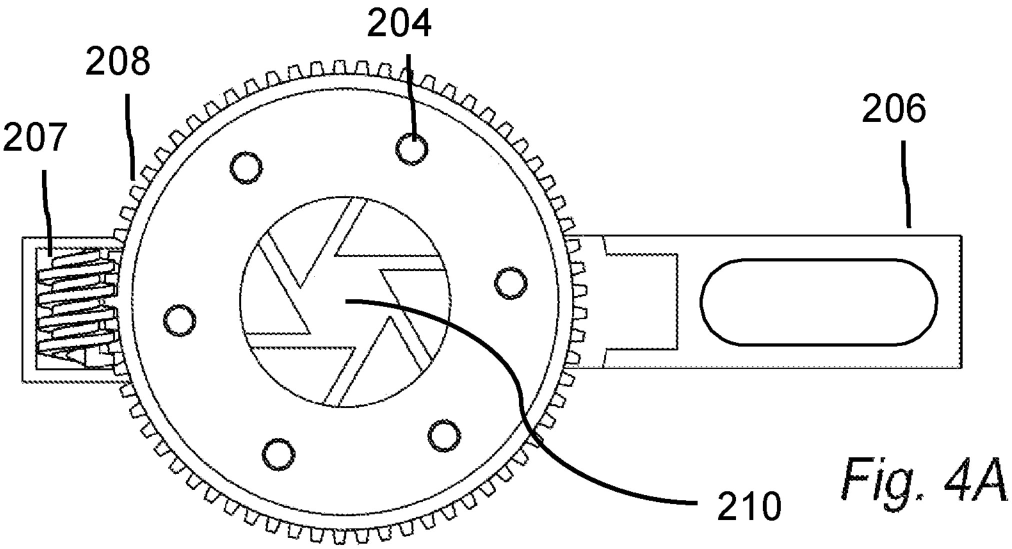
FIG. 4A is a top plan view of a third embodiment of an adjustable wrench with an interior polygon, in accordance with the present technology.
Figure 4B:
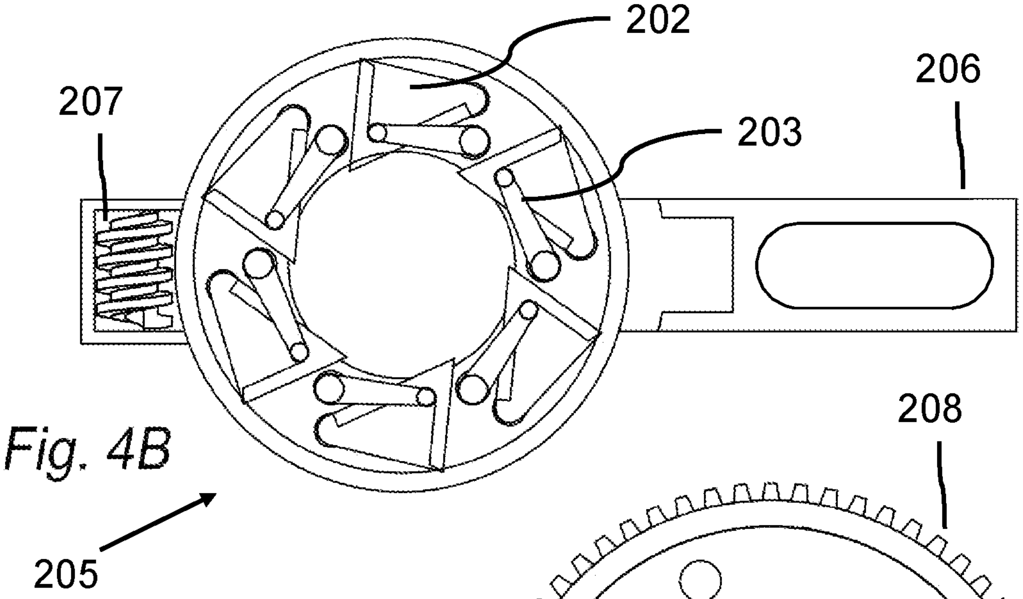
Figure 4C:
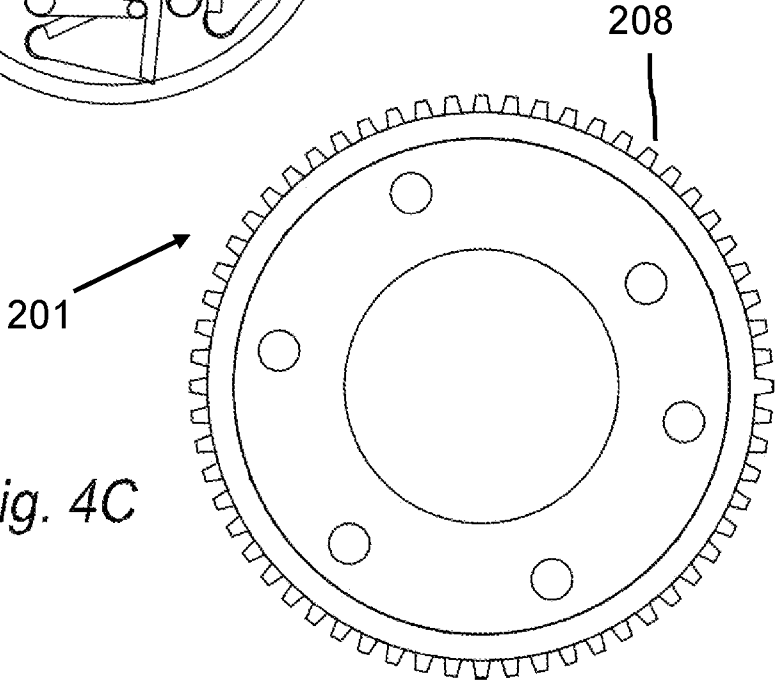
Figure 5:
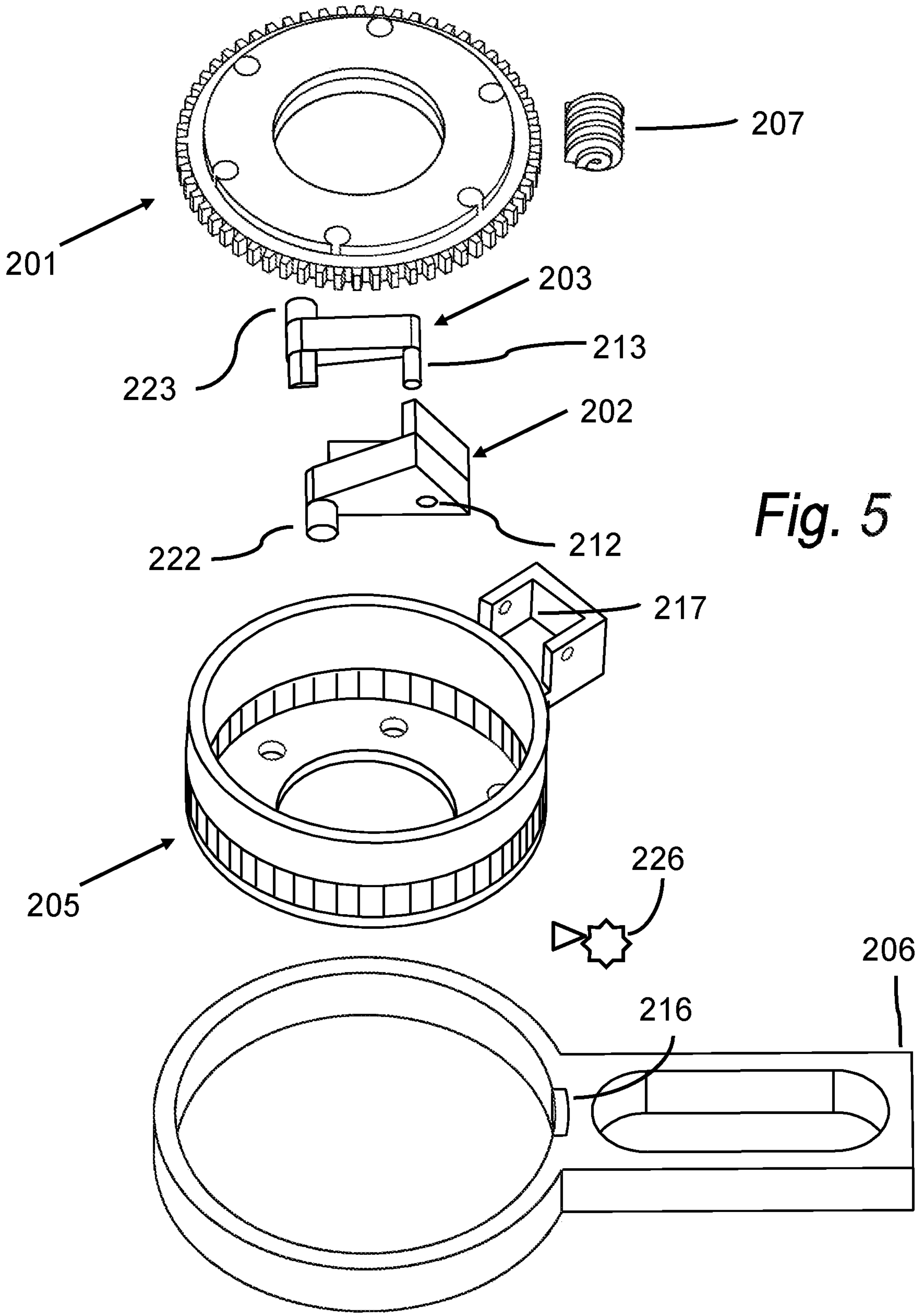
FIG. 5 is an exploded view of the third embodiment of the adjustable wrench showing the internal components thereof.

In certain embodiments, the plurality of grippers 202 and the plurality of push rods may be configured to couple to the plurality of holes 204 and fit within a space between the top plate 201 and the base plate 205. In certain embodiments, as the top plate 201 is rotated with respect to the base plate 205, the plurality of grippers may be configured to simultaneously move to adjust the size of the interior polygonal shape 210. In certain embodiments, the adjustable wrench 200 is only movable in a first direct to tighten or loosen a workpiece, such that the adjustable wrench 200 must be turned over to move the adjustable wrench 200 is a second opposite direction to tighten or loosen the workpiece. In certain embodiments, the worm screw 207 is configured to fit within a worm screw pocket 217 of the adjustable wrench 200. The worm screw pocket 217 may be in any appropriately desired location on the adjustable wrench 200, such that the worm screw 207 is capable of engaging the one or more teeth 208 of the top plate 201 to turn the top plate 201 when the worm screw 207 is moved in a first direction and a second direction. For example, as shown in FIGS. 4A, 4B, and 4D, the worm screw 207 may be on an outside edge of the base plate 205 where the worm screw 207 may contact the teeth 208 of the top plate 201.

The adjustable wrench 200 may include a ratcheting mechanism 226 for tightening and loosening the workpiece such that the ratcheting mechanism permits the adjustable wrench 200 to apply a turning force in one direction, while freely moving in the opposite direction. The ratcheting mechanism 226 may fit within a ratcheting mechanism pocket 216 of the adjustable wrench 200. The ratcheting mechanism 226 may include any appropriately desired mechanism to permit the adjustable wrench 200 to apply a turning force in one direction, while freely moving in the opposite direction. For example, the ratcheting mechanism 226 may include a gear and a pawl. Alternatively, in certain embodiments, the ratcheting mechanism 226 may include a ratcheting spring.

In certain embodiments, the plurality of grippers 202 attach to the top plate 201 and the plurality of push rods 203 attach to the base plate 205. Alternatively, the plurality of grippers 202 attach to the base plate 205 and the plurality of push rods attach to the top plate 201. In certain embodiments, a gripper 202 may include a gripper hole 212 at a corner of the gripper 202 for receiving a first push rod stud 213 of the push rod 203. The gripper 202 may be continuously tightened onto a workpiece as the workpiece is turned using the adjustable wrench 200. For example, when the handle 206 and/or the adjustable wrench 200 is pushed in a proper direction, the push rods 203 will push the grippers 202 to the inside, tightening the interior polygonal shape 210 onto the workpiece.

In certain embodiments, the base plate 205 together with the top plate 201 form an enclosure for the components of the adjustable wrench 200. In certain embodiments, a plurality of holes 204 within the base plate 205 and the top plate 201 may be spaced approximately sixty degrees apart to engage six grippers 202 and six push rods 203. In this manner, when the top plate 201 is rotated, a six-sided polygon (i.e., a hexagon) is formed in a center opening of the base plate 205 and the top plate 201 for engaging each side of a six-sided workpiece. However, as would be apparent to someone of ordinary skill in the art, the base plate 205 and/or the top plate 201 may comprise any appropriately desired number of holes 204 for securing an appropriately desired number of grippers 202 and push rods 203 to form various polygonal center openings, as desired.

A gripper 202 may include a gripper stud 222 and a gripper hole 212 for receiving a first push rod stud 213. The gripper stud 222 may engage a hole 204 of one of the base plate 205 and the top plate 201. The push rod 203 may include the first push rod stud 213 for engaging the gripper 202 at an interior of the gripper 202 in the gripper hole 212. The push rod 203 may also include a second push rod stud 223 for engaging a hole 204 of one of the base plate 205 and the top plate 201. Where the gripper stud 222 engages a hole 204 of the base plate 205, the second push rod stud 223 may engage a hole 204 of the top plate 201. Alternatively, where the gripper stud 222 engages a hole 204 of the top plate 201, the second push rod stud 223 may engage a hole 204 of the base plate 205.

In certain embodiments, an edge of the top plate 201 is configured to fit inside an edge of the base plate 205. Alternatively, the top plate 201 may be configured to fit over an edge of the base plate 205. The grippers 202 and the push rods 203 may be configured to fit between the base plate 205 and the top plate 201 when the base plate 205 and the top plate 201 are coupled together. The base plate 205 and the top plate 201 may have a same size center opening such that the grippers 202 may be adjusted and used to grab a workpiece.

Figure 6A:
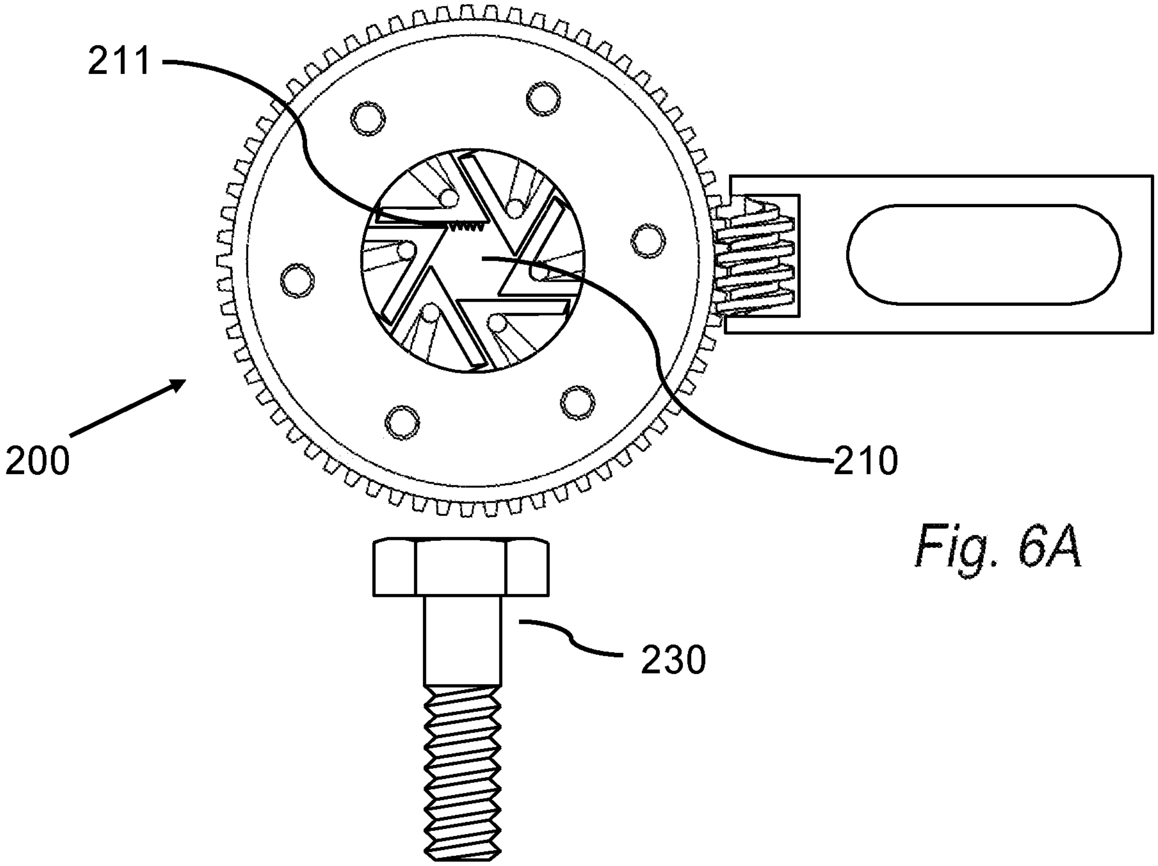
FIGS. 6A and 6B depict an adjustable wrench with the interior polygon engaging a workpiece and tightening onto the workpiece as indicate by the arrows.
Figure 6B:
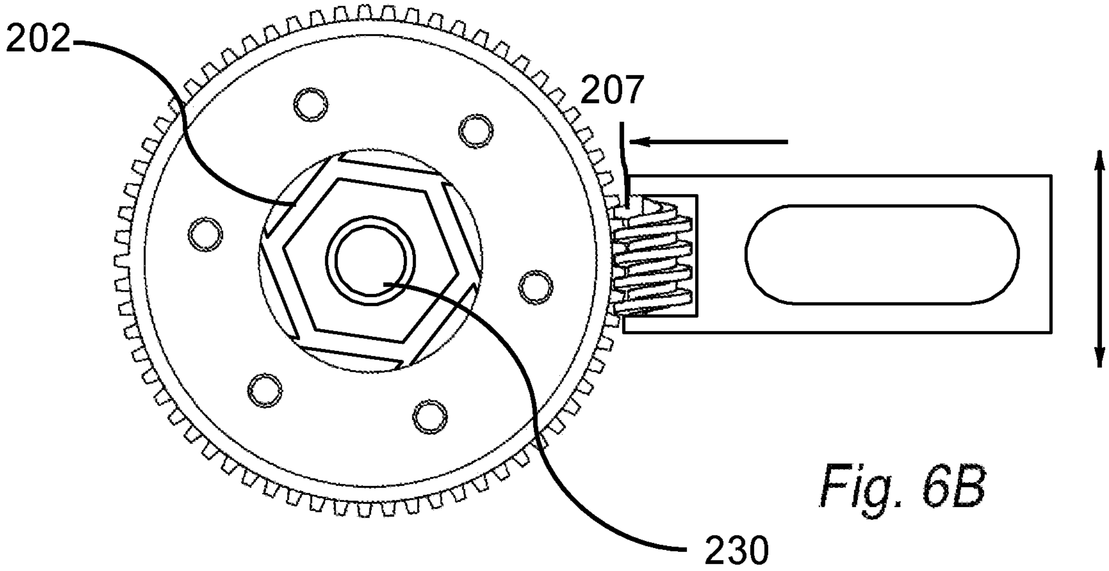

When the top plate 201 is rotated with respect to the base plate 205, the push rods 203, which are coupled to the base plate 205, push an inner portion of the grippers 202, and change an orientation of the grippers 202 to make the interior polygonal shape 210 bigger or smaller for engaging an appropriately sized workpiece. As shown in FIGS. 6A and 6B, when the interior polygonal shape 210 is fitted to the workpiece 230, the adjustable wrench 200 may be turned to move the workpiece 230 in a proper direction. As the adjustable wrench 200 is turned, the push rods 203 push the grippers 202 inward, thus tightening the grip on the workpiece 230. In certain embodiments, the grippers 202 may include one or more teeth 211 or an abrasive surface for gripping the workpiece 230.

Figure 7:
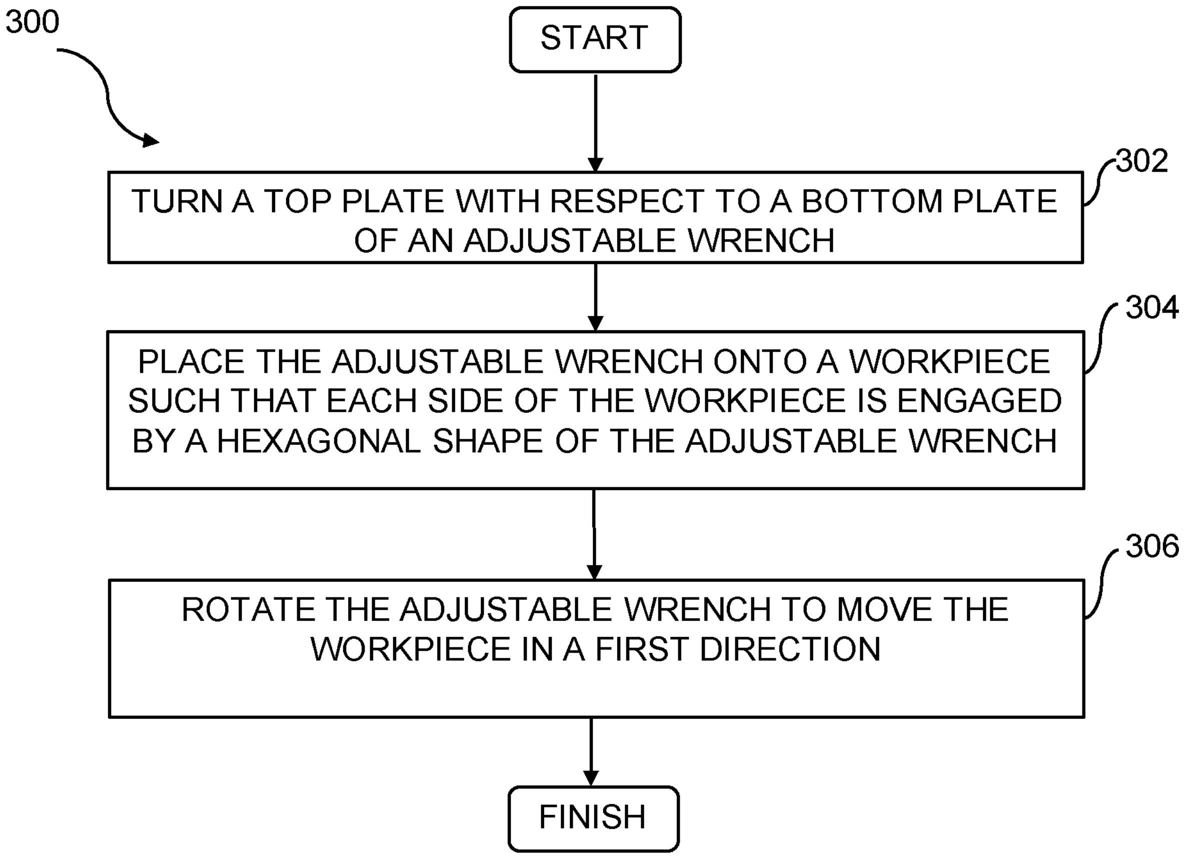
FIG. 7 is a flowchart of a method of using an adjustable wrench in accordance with the present technology.

Referring to FIG. 7, a method 300 of using an adjustable wrench 100, 200 is shown. In step 302, a top plate 101, 201 may be turned with respect to a base plate 105, 205 of the adjustable wrench 100, 200. Turning the top plate 101, 201 with respect to the base plate 105, 205 of the adjustable wrench 100, 200 may adjust a size of an interior polygonal shape 110, 210 of the adjustable wrench 100, 200 fit a differently sized workpiece 230. In step 304, the adjustable wrench 100, 200 may be fitted onto the workpiece 230. In certain embodiments, when the interior polygonal shape 110, 210 is placed onto the workpiece 230, each side of the workpiece 230 may be engaged by the interior polygonal shape 110, 210. With the adjustable wrench 100, 200 properly fitted onto the workpiece 230, in step 306, the adjustable wrench 100, 200 may be rotated in a first direction to tighten the workpiece 230. In certain embodiments, a worm screw 207 may be used to rotate the top plate 101, 201 with respect to the base plate 105, 205. The method may further include, removing the adjustable wrench 100, 200 from the workpiece 230, turning the adjustable wrench 100, 200 over, placing the adjustable wrench 100, 200 back onto the workpiece 230, and turning the adjustable wrench 100, 200 in a second direction, opposite the first direction to loosen the workpiece 230.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An adjustable wrench, comprising:

a base plate;

a top plate rotatably coupled to the base plate;

a plurality of grippers, which form an interior polygonal shape within a center of the base plate and the top plate; and a plurality of push rods, each push rod coupled to a respective gripper, wherein:

the plurality of grippers and the plurality of push rods are configured to fit between the base plate and the top plate, and as the top plate is rotated with respect to the base plate, the push rods move the grippers to change a size of the interior polygonal shape.

2. The adjustable wrench of claim 1, wherein a plurality of holes of the base plate and the top plate are configured to hold the plurality of grippers and the push rods.

3. The adjustable wrench of claim 2, wherein the base plate and the top plate each include six holes for holding six grippers and six push rods, the six grippers forming an interior hexagonal shape.

4. The adjustable wrench of claim 3, wherein the six holes of each of the base plate and the top plate are spaced approximately sixty degrees apart around a circumference of the base plate and the top plate, respectively.

5. The adjustable wrench of claim 1, wherein the interior polygonal shape is configured to engage six sides of a workpiece.

6. The adjustable wrench of claim 5 wherein the interior polygonal shape is configured to engage one of a standard sized workpiece and a metric sized workpiece.

7. The adjustable wrench of claim 1, wherein the plurality of grippers simultaneously move as the top plate is rotated with respect to the base plate.

8. The adjustable wrench of claim 1, wherein the plurality of grippers include a plurality of teeth for gripping the workpiece.

9. The adjustable wrench of claim 1, further including a worm screw for rotating the top plate with respect to the base plate.

10. The adjustable wrench of claim 1, wherein the adjustable wrench is only movable in a first direction to one of tighten and loosen a workpiece.

11. The adjustable wrench of claim 10, wherein the adjustable wrench is configured to be turned over to move the adjustable wrench in a second opposite direction to the other of tighten and loosen the workpiece.

12. The adjustable wrench of claim 1, further including a ratcheting mechanism.

13. The adjustable wrench of claim 1, wherein the plurality of grippers is attached to the top plate and the plurality of push rods is attached to the base plate.

14. The adjustable wrench of claim 1, wherein each gripper includes a gripper hole at a corner of the gripper for receiving a first push rod stud of the push rod.

15. The adjustable wrench of claim 1, wherein the interior polygonal shape is continuously tightened onto a workpiece as the workpiece is turned using the adjustable wrench.

16. An adjustable wrench, comprising:

a base plate;

a top plate rotatably coupled to the base plate;

a plurality of grippers, which form an interior polygonal shape within a center of the base plate and the top plate; and a plurality of push rods, each push rod coupled to a respective gripper, wherein:

the plurality of grippers is attached to the base plate and the plurality of push rods is attached to the top plate, and as the top plate is rotated with respect to the base plate, the push rods move the grippers to change a size of the interior polygonal shape.

17. A method of using an adjustable wrench comprising:

providing the adjustable wrench, wherein the adjustable wrench includes:

a base plate;

a top plate rotatably coupled to the base plate;

a plurality of grippers, which form an interior polygonal shape within a center of the base plate and the top plate; and a plurality of push rods, each push rod coupled to a respective gripper, wherein:

the plurality of grippers and the plurality of push rods are configured to fit between the base plate and the top plate, and as the top plate is rotated with respect to the base plate, the push rods move the grippers to change a size of the interior polygonal shape;

turning the top plate with respect to the base plate of the adjustable wrench, to adjust the size of the interior polygonal shape of the adjustable wrench to fit a workpiece;

fitting the interior polygonal shape onto the workpiece, wherein when the interior polygonal shape is placed onto the workpiece, each side of the workpiece is engaged by the interior polygonal shape; and rotating the adjustable wrench in a first direction to one of tighten and loosen the workpiece.

18. The method of claim 17, comprising using a worm screw to rotate the top plate with respect to the base plate.

19. The method of claim 17, comprising:

removing the adjustable wrench from the workpiece;

turning the adjustable wrench over;

placing the adjustable wrench back onto the workpiece; and turning the adjustable wrench in a second direction opposite the first direction to the other of tighten and loosen the workpiece.

* * * * *